(12) United States Patent
Do

(10) Patent No.: US 8,196,934 B2
(45) Date of Patent: Jun. 12, 2012

(54) SLIDER SEAL ASSEMBLY FOR GAS TURBINE ENGINE

(75) Inventor: Logan H. Do, Canton, CT (US)

(73) Assignee: United Technologies Corporation, Hartford, CT (US)

(*) Notice: Subject to any disclaimer, the term of this patent is extended or adjusted under 35 U.S.C. 154(b) by 899 days.

(21) Appl. No.: 11/621,601

(22) Filed: Jan. 10, 2007

(65) Prior Publication Data
US 2008/0164658 A1 Jul. 10, 2008

(51) Int. Cl.
*F01D 25/24* (2006.01)
*F04D 29/08* (2006.01)
*F16J 15/34* (2006.01)

(52) U.S. Cl. ........ 277/580; 277/581; 277/422; 415/201; 415/214.1

(58) Field of Classification Search ......... 277/384, 277/579, 580, 581, 422; 415/201, 118, 214.1, 415/144, 145
See application file for complete search history.

(56) References Cited

U.S. PATENT DOCUMENTS

| | | | | |
|---|---|---|---|---|
| 1,822,056 A | * | 9/1931 | Noble | 285/340 |
| 2,245,475 A | * | 6/1941 | Hately | 277/384 |
| 2,273,962 A | * | 2/1942 | Hubbard | 277/555 |
| 2,426,174 A | * | 8/1947 | Bottomley | 277/402 |
| 2,481,430 A | * | 9/1949 | Koller | 277/383 |
| 2,813,692 A | * | 11/1957 | Peterson et al. | 248/56 |
| 2,969,248 A | * | 1/1961 | Sulkowski | 277/301 |
| 3,090,631 A | * | 5/1963 | Hoover | 277/580 |
| 3,160,418 A | * | 12/1964 | Barske | 277/384 |
| 3,389,920 A | * | 6/1968 | Allan et al. | 277/580 |
| 3,412,928 A | * | 11/1968 | Hull et al. | 415/214.1 |
| 3,480,285 A | * | 11/1969 | Anderson | 277/391 |
| 3,572,733 A | * | 3/1971 | Howald et al. | 277/411 |
| 3,597,111 A | * | 8/1971 | Salisbury et al. | 416/206 |
| 3,600,048 A | * | 8/1971 | Makhobey | 277/544 |
| 3,752,544 A | * | 8/1973 | Hay | 384/484 |
| 3,793,838 A | | 2/1974 | Nash | |
| 3,807,435 A | * | 4/1974 | Fenster et al. | 137/317 |
| 3,870,064 A | * | 3/1975 | Vigneron | 137/15.13 |
| 4,042,248 A | * | 8/1977 | Williamitis | 277/555 |
| 4,062,574 A | * | 12/1977 | Scholin | 285/340 |
| 4,155,681 A | * | 5/1979 | Linko et al. | 415/144 |
| 4,296,675 A | * | 10/1981 | Gies | 91/396 |
| 4,331,338 A | * | 5/1982 | Caldwell et al. | 277/606 |
| 4,383,406 A | * | 5/1983 | Oexler et al. | 57/406 |
| 4,406,580 A | * | 9/1983 | Baran, Jr. | 415/118 |
| 4,411,437 A | * | 10/1983 | Conti | 277/422 |
| 4,585,390 A | * | 4/1986 | Pirtle et al. | 415/160 |
| 4,586,734 A | * | 5/1986 | Grenier | 285/340 |

(Continued)

OTHER PUBLICATIONS

Partial European Search Report for Application No. EP 08 25 0061 mailed Oct. 5, 2011.

(Continued)

*Primary Examiner* — Alison Pickard
(74) *Attorney, Agent, or Firm* — Carlson, Gaskey & Olds PC

(57) ABSTRACT

A slider seal assembly for a gas turbine engine includes a housing, a seal plate moveable relative to the housing and a retaining ring. The housing includes an outer surface, an inner surface, and a recessed opening between the outer surface and the inner surface. The seal plate is received within the recessed opening. The inner surface of the housing includes a curved portion which is curved in an outward direction toward the outer surface.

21 Claims, 4 Drawing Sheets

U.S. PATENT DOCUMENTS

| | | | |
|---|---|---|---|
| 4,702,671 A | | 10/1987 | Brinkman et al. |
| 4,815,276 A | * | 3/1989 | Hansel et al. ............... 60/803 |
| 4,875,691 A | * | 10/1989 | Kosi ........................ 277/545 |
| 4,961,597 A | * | 10/1990 | Bowen ....................... 285/24 |
| 4,971,306 A | | 11/1990 | Jinnouchi et al. |
| 5,037,115 A | | 8/1991 | Brandon |
| 5,185,996 A | * | 2/1993 | Smith et al. ............... 60/772 |
| 5,222,862 A | * | 6/1993 | Groenendaal et al. ......... 415/9 |
| 5,275,529 A | * | 1/1994 | Langenbrunner et al. .... 415/119 |
| 5,445,394 A | * | 8/1995 | Dusserre-Telmon et al. . 277/422 |
| 5,609,467 A | * | 3/1997 | Lenhart et al. ............. 415/142 |
| 5,692,858 A | * | 12/1997 | Vaughan ..................... 405/43 |
| 5,867,976 A | * | 2/1999 | Ziegler, Jr. ................. 60/803 |
| 6,095,529 A | * | 8/2000 | Stahlecker .................. 277/422 |
| 6,206,632 B1 | * | 3/2001 | Gallus ....................... 415/144 |
| 6,375,410 B2 | * | 4/2002 | Clouse et al. ................. 415/9 |
| 6,412,824 B2 | * | 7/2002 | Kunsman .................... 285/197 |
| 6,422,570 B2 | * | 7/2002 | Ikeda et al. ................. 277/552 |
| 6,468,033 B1 | * | 10/2002 | Weidlich .................... 415/118 |
| 6,893,022 B2 | * | 5/2005 | Stahlecker .................. 277/411 |
| 6,910,853 B2 | * | 6/2005 | Corman et al. ............... 415/136 |
| 6,942,452 B2 | * | 9/2005 | Bruno et al. ................. 415/135 |
| 7,290,981 B2 | * | 11/2007 | Guzorek ..................... 415/151 |
| 7,798,765 B2 | * | 9/2010 | Snyder et al. ................ 415/1 |
| 2002/0000719 A1 | * | 1/2002 | Kunsman .................... 285/197 |
| 2004/0135367 A1 | * | 7/2004 | Otsuga et al. ............ 285/133.11 |
| 2005/0058537 A1 | * | 3/2005 | Corman et al. ............... 415/139 |
| 2006/0097457 A1 | | 5/2006 | Flaherty |
| 2006/0218934 A1 | * | 10/2006 | Williams et al. ............... 60/785 |
| 2007/0120328 A1 | * | 5/2007 | Haselbacher et al. ........ 277/404 |
| 2008/0009889 A1 | * | 1/2008 | Pokorney et al. ............ 606/155 |
| 2008/0084030 A1 | * | 4/2008 | Wilson, Jr. .................. 277/409 |
| 2008/0164658 A1 | * | 7/2008 | Do ............................ 277/355 |
| 2008/0277228 A1 | * | 11/2008 | George ....................... 192/48.1 |
| 2011/0123319 A1 | * | 5/2011 | Eastwood et al. ......... 415/182.1 |

OTHER PUBLICATIONS

Extended European Search Report for Application No. EP 08 25 0061 mailed Jan. 12, 2012.

* cited by examiner

SLIDER SEAL ASSEMBLY FOR GAS TURBINE ENGINE

This invention was made with government support under Contract No. N00019-02-C-3003 awarded by the United States Navy. The Government therefore has certain rights in this invention.

BACKGROUND OF THE INVENTION

This invention generally relates to a gas turbine engine, and more particularly to a slider seal assembly for a gas turbine engine.

In an aircraft gas turbine engine, such as a turbofan engine, air is pressurized in a compressor and mixed with fuel in a combustor for generating hot combustion gases. The hot combustion gases flow downstream through turbine stages which extract energy from the gases. In a two spool gas turbine engine, a high pressure turbine powers a high pressure compressor, while a low pressure turbine powers a fan section disposed upstream of the compressor and a low pressure compressor.

Combustion gases are discharged from the turbofan engine through a core exhaust nozzle and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust is provided from the combustion gases discharged through the core exhaust nozzle.

The core engine components, including the compressor, the combustor and the turbine, are surrounded by a cylindrical outer casing. A multitude of interface parts, such as borescope plugs, are received within openings of the outer casing and provide access points for inspecting the internal components of the core engine. The interface parts are removable to access the interior of the core engine. For example, fiber optics equipment may be inserted into an opening of the outer casing upon removal of a borescope plug to detect debris, cracking or other damage to the interior components of the gas turbine engine.

Additionally, gas turbines engines may include numerous other interface parts, such as fuel fittings, customer bleed ports and the like. Seal assemblies are required to seal the interface between the interface parts and the openings of the outer casing. That is, the seal assemblies reduce airflow leakage between the interface parts and the outer casing as airflow is communicated within the core engine during engine operation.

The seal assemblies typically include a housing and a metallic seal plate, such as a titanium seal plate. The housing is mounted to the outer casing, the seal plate is affixed adjacent to the housing, and the interface part extends through openings of the seal plate and the housing to provide a seal therebetween. The opening of the seal plate must be machined or drilled at an angle to compensate for the curvature of the outer casing.

Disadvantageously, interface parts may experience heavy wear near the contact area between the interface part and the seal plate due to the metallic nature of the seal plate and the angle at which the interface parts extend through the seal plate. The heavy wear at this contact area may result in airflow leakage between the core airflow passage and the fan bypass airflow passage of the gas turbine engine. Increased wear at the interface between the seal assemblies and the interface parts may be furthered by thermal growth mismatch. This is caused by the severe temperature differences the engine experiences between the core airflow passage and the fan bypass airflow passage, which may cause displacement of the interface parts relative to the seal plates.

Accordingly, it is desirable to provide an effective slider seal assembly that reduces wear and reduces airflow leakage between the core airflow passage and the fan bypass airflow passage of a gas turbine engine.

SUMMARY OF THE INVENTION

A slider seal assembly for a gas turbine engine includes a housing, a seal plate moveable relative to the housing and a retaining ring. The housing includes an outer surface, an inner surface, and a recessed opening between the outer surface and the inner surface. The seal plate is received within the recessed opening. The inner surface of the housing includes a curved portion curved in an outward direction toward the outer surface A slider seal assembly for a gas turbine engine includes a housing and a seal plate which is moveable relative to the housing. The housing includes an outer surface, an inner surface, a body portion extending between the inner surface and the outer surface, and an opening through the housing. The seal plate is received within a recessed opening of the body portion of the housing. The seal plate includes an opening and is positioned adjacent to the opening of the housing. An interface part extends through both the opening of the housing and the opening of the seal plate.

A gas turbine engine system includes an outer engine casing, a compressor, a combustor and a turbine housed within the outer engine casing, and a plurality of slider seal assemblies mounted to the outer engine casing. A portion of an inner surface of each of the plurality of the slider seal assemblies is curved to match a contour of the outer engine casing.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
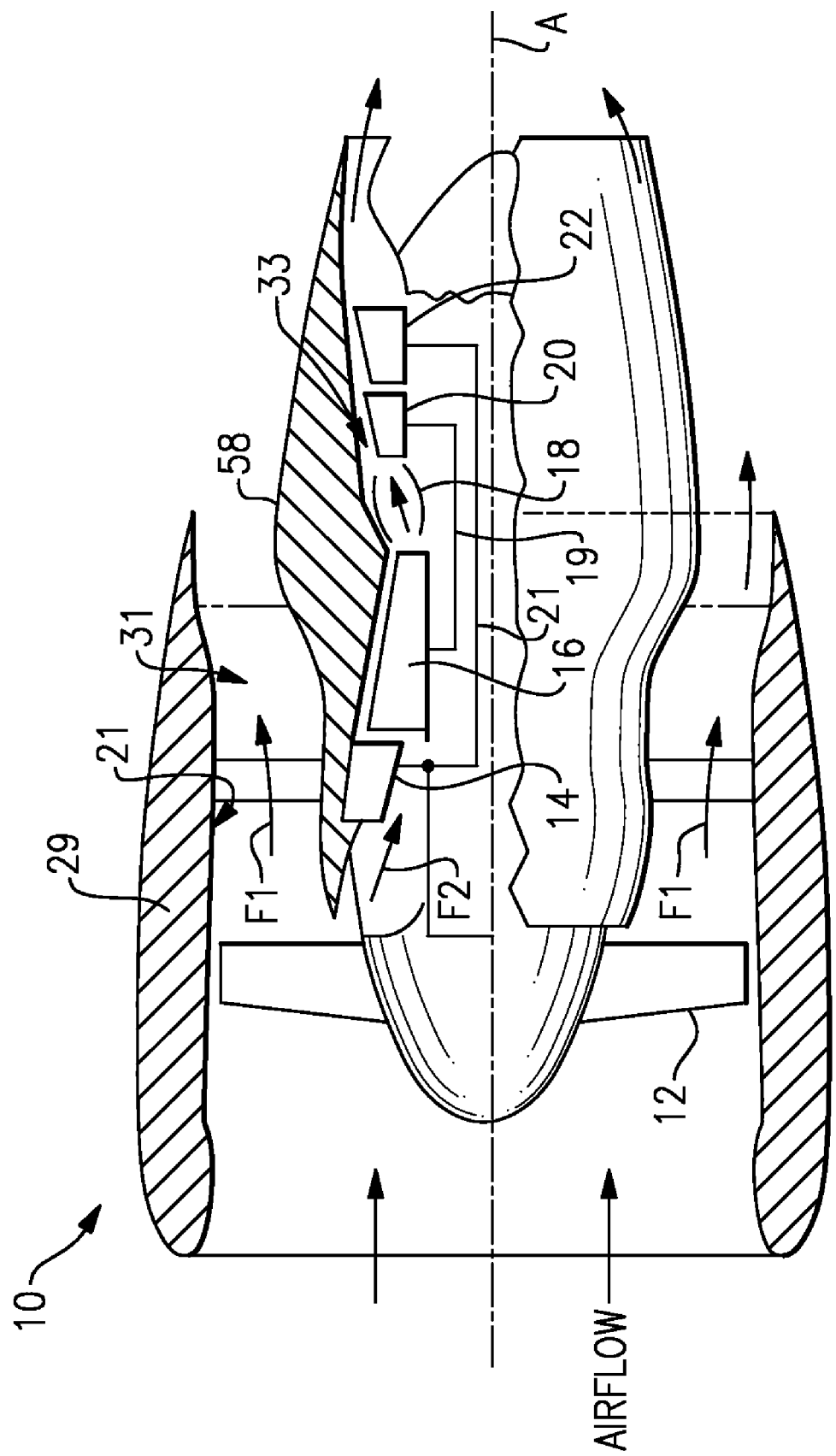
FIG. 1 illustrates a general perspective view of a gas turbine engine.
Figure 2:
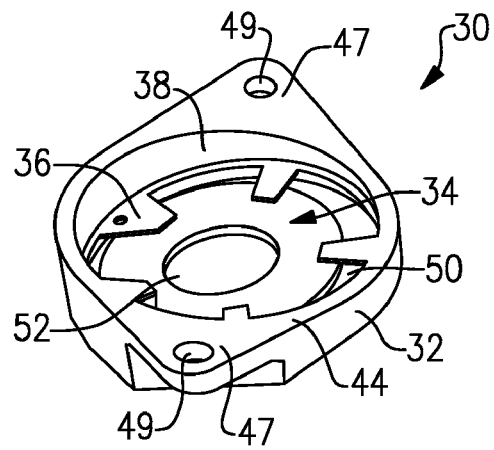
FIG. 2 illustrates a general perspective view of an example slider seal assembly.
Figure 3:
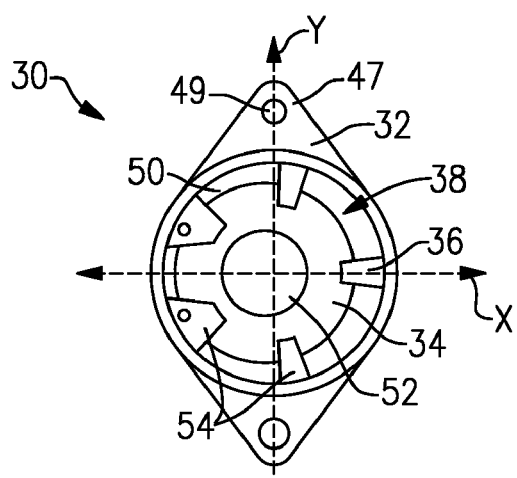
FIG. 3 is another view of the example slider seal assembly
Figure 4:
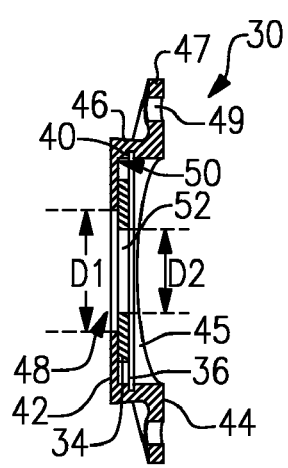
FIG. 4 illustrates a cross-sectional view of the example slider seal assembly illustrated in FIG. 2.
Figure 5:
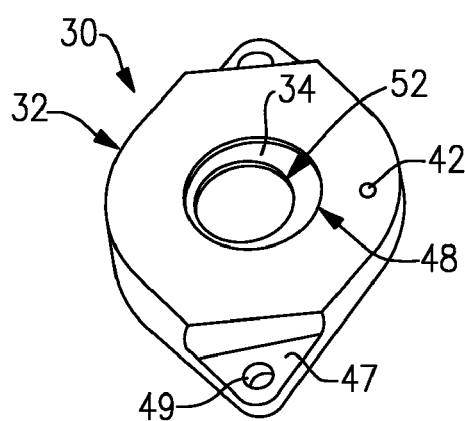
FIG. 5 is yet another view of the slider seal assembly.

FIG. 1 illustrates a gas turbine engine 10 which includes (in serial flow communication) a fan section 12, a low pressure compressor 14, a high pressure compressor 16, a combustor 18, a high pressure turbine 20, and a low pressure turbine 22. During operation, air is pulled into the gas turbine engine 10 by the fan section 12, pressurized in the compressors 14, 16, and is mixed with fuel and burned in the combustor 18. Hot combustion gases generated within the combustor 18 flow through the high and low pressure turbines 20, 22, which extract energy from the hot combustion gases. In a two spool design, the high pressure turbine 20 powers the high pressure compressor 16 through a high speed shaft 19 and the low pressure turbine 22 powers the fan section 12 and a low pressure compressor 14 through a low speed shaft 21. However, the invention is not limited to the two spool gas turbine architecture described and may be used with other architectures such as a single spool axial design, a three spool axial design and other architectures. That is, the present invention is applicable to any gas turbine engine.

A nacelle 29 is disposed circumferentially about an engine centerline axis A and surrounds the numerous components of the gas turbine engine 10. A fan bypass passage 31 extends between an inner surface 23 of the nacelle 29 and an outer engine casing 58, which houses the compressor sections 14, 16, the combustor 18 and the turbine sections 20, 22. A portion F2 of incoming airflow enters the gas turbine engine 10 and is communicated through a core airflow passage 33, while the remaining portion F1 of incoming airflow is communicated through the fan bypass passage 31 to provide additional thrust for powering the aircraft.

FIGS. 2-5 illustrate an example slider seal assembly 30. The slider seal assembly 30 includes a housing 32, a seal plate 34, and a retaining ring 36. The housing 32 includes a recessed opening 38 for receiving the seal plate 34. The retaining ring 36 is received within a slot 40 (See FIG. 4) of the recessed opening 38 to retain the seal plate 34 within the recessed opening 38.

The housing 32 includes an outer surface 42 and an inner surface 44. The recessed opening 38 extends circumferentially from the inner surface 44 in an outward direction towards the outer surface 42. A body portion 46 of the housing 32 generally surrounds the recessed opening 38 and at least partially houses the seal plate 34 within the recessed opening 38. An opening 48 having a diameter D1 extends through the housing 32 and receives an interface part 56, as is further discussed below with respect to FIG. 6. The opening 48 opens into the recessed opening 38. The recessed opening 38 includes a diameter which is larger than the diameter D1.

The inner surface 44 of the housing 32 includes a curved portion 45. The curved portion 45 is curved in a direction towards the outer surface 42. That is, the curved portion 45 extends in an outward direction from the inner surface 44. It should be understood that the actual dimensions of the curved portion 45 will vary depending upon design specific parameters including, but not limited to, the size of the outer engine casing 58.

The housing 32 also includes flanges 47 disposed radially outwardly from the body portion 46. The flanges 47 are disposed near opposite ends of the housing 32 and each include an opening 49 for receiving a fastener to attach the slider seal assemblies 30 to the outer engine casing 58 of the gas turbine engine 10. Each flange 47 is generally illustrated as triangular is shape, although other shapes are contemplated as would be recognized by a person of ordinary skill in the art having the benefit of this disclosure to attach the slider seal assemblies 30 to the outer engine casing 58.

The seal plate 34 is received against an inner wall 50 of the recessed opening 38. The inner wall 50 is the inner surface of the outer surface 42 of the housing 32. The seal plate 34 also includes an opening 52. The opening 52 is positioned adjacent the opening 48 of the housing 32 when received within the recessed opening 38, and includes a diameter D2. The diameter D2 of the opening 52 is generally smaller than the diameter D2 of the opening 48. The seal plate 34 slides relative to the housing 32 to compensate for movement of the interface part 56 (See FIG. 6).

The retaining ring 36 includes a plurality of tabs 54. The tabs 54 allow movement of the seal plate 34 in axial directions X and Y relative to the housing 32 while maintaining the seal plate 34 adjacent to the inner wall 50 of the housing 32 (See FIG. 3). A person of ordinary skill in the art would understand how to design the retaining ring 36 to retain the seal plate 34 within the recessed opening 38.

Figure 6:
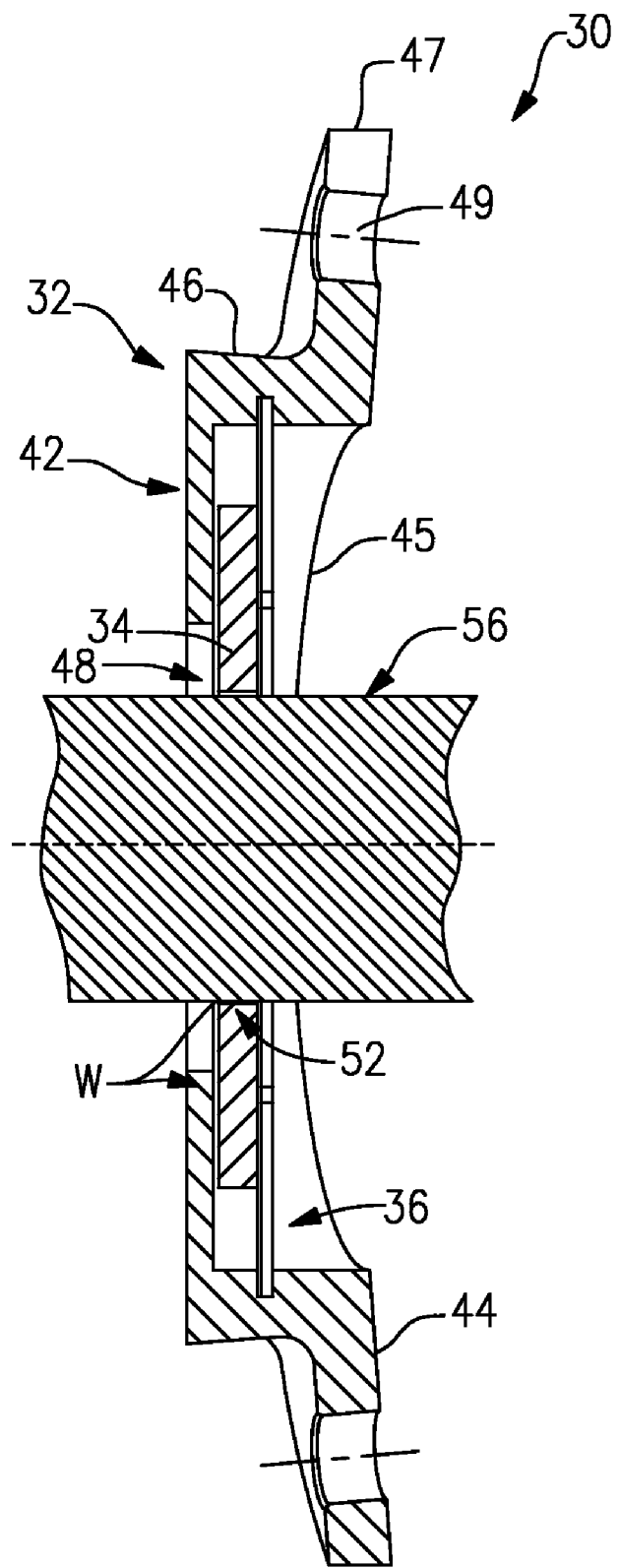
FIG. 6 illustrates a cross-sectional view of the slider seal assembly having an interface part extending therethrough.

Referring to FIG. 6, an interface part 56 extends from the gas turbine engine 10 through the openings 48, 52 of the housing 32 and seal plate 34 of the slider seal assembly 30. In one example, the interface part 56 is a borescope plug. A gas turbine engine 10 may include multiple borescope plugs. The borescope plugs are removable for inspection of the internal components of the gas turbine engine 10, such as with fiber optics equipment.

For example, the fiber optics equipment may be used to inspect for debris, cracking or other damage to the internal components of the compressor sections 14, 16, the combustor 18, or the turbine sections 20, 22 of the gas turbine engine 10. In another example, the interface part 56 is a fuel fitting. In yet another example, the interface part 56 is a customer bleed port. It should be understood that the interface part 56 may include any part of the gas turbine engine 10 which may experience displacement as a result of thermal growth mismatch.

The slider seal assembly 30 seals the gas turbine engine 10 at the interface part 56. A seal is necessitated by providing an opening in the gas turbine engine 10 for receiving the interface part 56. During normal gas turbine engine 10 operation, there is typically a temperature difference between the airflow F2 within the core airflow passage 33 and the airflow F1 within the fan bypass passage 31 (See FIG. 8). The temperature difference may cause thermal growth mismatch between the core airflow passage 33 and the fan bypass passage 31. That is, the gas turbine engine 10 may expand and retract in both the radial and axial directions relative to the engine centerline axis A because of the extreme temperature differences. The thermal growth mismatch may result in displacement of the interface part 56. The slider seal assembly 30 is designed to compensate for the thermal growth mismatch and provide lubrication at wear surfaces W as the interface part 56 travels during the thermal growth mismatch. The wear surfaces W represent the wear areas that result from the interface parts 56 rubbing against the seal plate 34 and the housing 32 during thermal growth mismatch.

The interface part 56 extends through the opening 48 of the housing 32 in a direction normal to the outer surface 42. Because the seal plate 34 is slideable relative to the housing 32, the interface part 56 extends in a direction normal to the outer surface 42 during engine operation, and maintains the perpendicular positioning during any thermal growth mismatch. That is, the seal plate 34 slides in the axial directions X and Y (See FIG. 3) in response to any expansion/retraction by the gas turbine engine 10. As stated above, the diameter D1 of the opening 48 of the housing 32 is larger than the diameter D2 of the opening 52 of the seal plate 34. Therefore, the interface part 56 has enough clearance space to avoid contact with the housing 32 during displacement caused by thermal growth mismatch. The slider seal assembly 30 therefore reduces rubbing at the wear surfaces W, reduces the amount of corner scraping between the seal plate 34 and the interface part 56, and improves leakage performance of the gas turbine engine 10.

The seal plate 34 includes a fiber reinforced composite. The composite material further reduces contact between the interface part 56 and the wear surfaces W of the seal plate 34 and the housing 32. In one example, the fiber reinforced composite is NR150. In another example, the composite includes PMR15. It should be understood that the seal plate 34 may be comprised of any other composite type material, including any known polyimide composite material.

Figure 7:
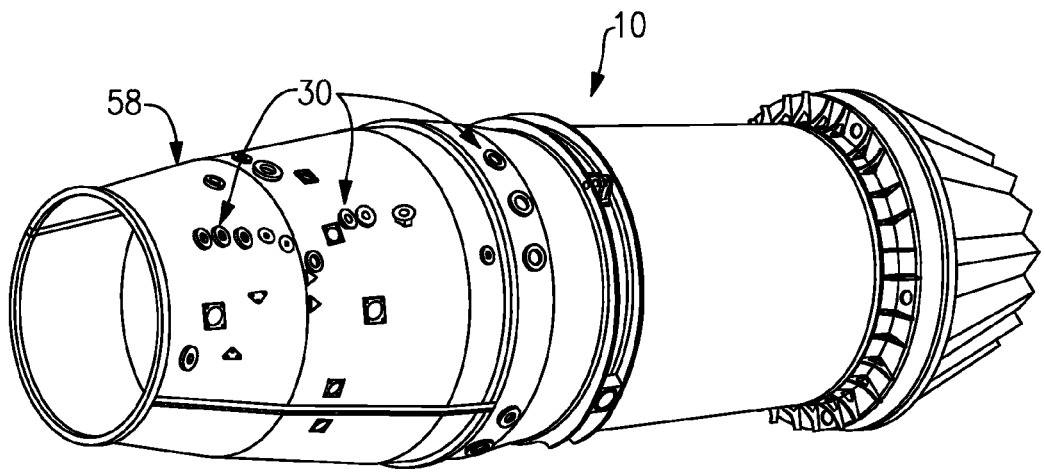
FIG. 7 illustrates a gas turbine engine including multiple slider seal assemblies mounted to an outer engine casing of the gas turbine engine.

FIG. 7 illustrates an example gas turbine engine 10 including a plurality of slider seal assemblies 30. The slider seal assemblies 30 are mounted to the outer engine casing 58 of the gas turbine engine 10. Multiple slider seal assemblies 30 may be mounted adjacent to the compressor sections 14, 16, the combustor 18, the turbine sections 20, 22 or any other section of the gas turbine engine 10. The curved portion 45 of the inner surface 44 of each housing 32 (See FIG. 4) includes a curvature which matches the outer contour of the outer engine casing 58. The curved portion 45 of the inner surface 44 provides an improved interface between the slider seal assemblies 30 and the outer engine casing 58, thereby reducing airflow leakage.

Figure 8:
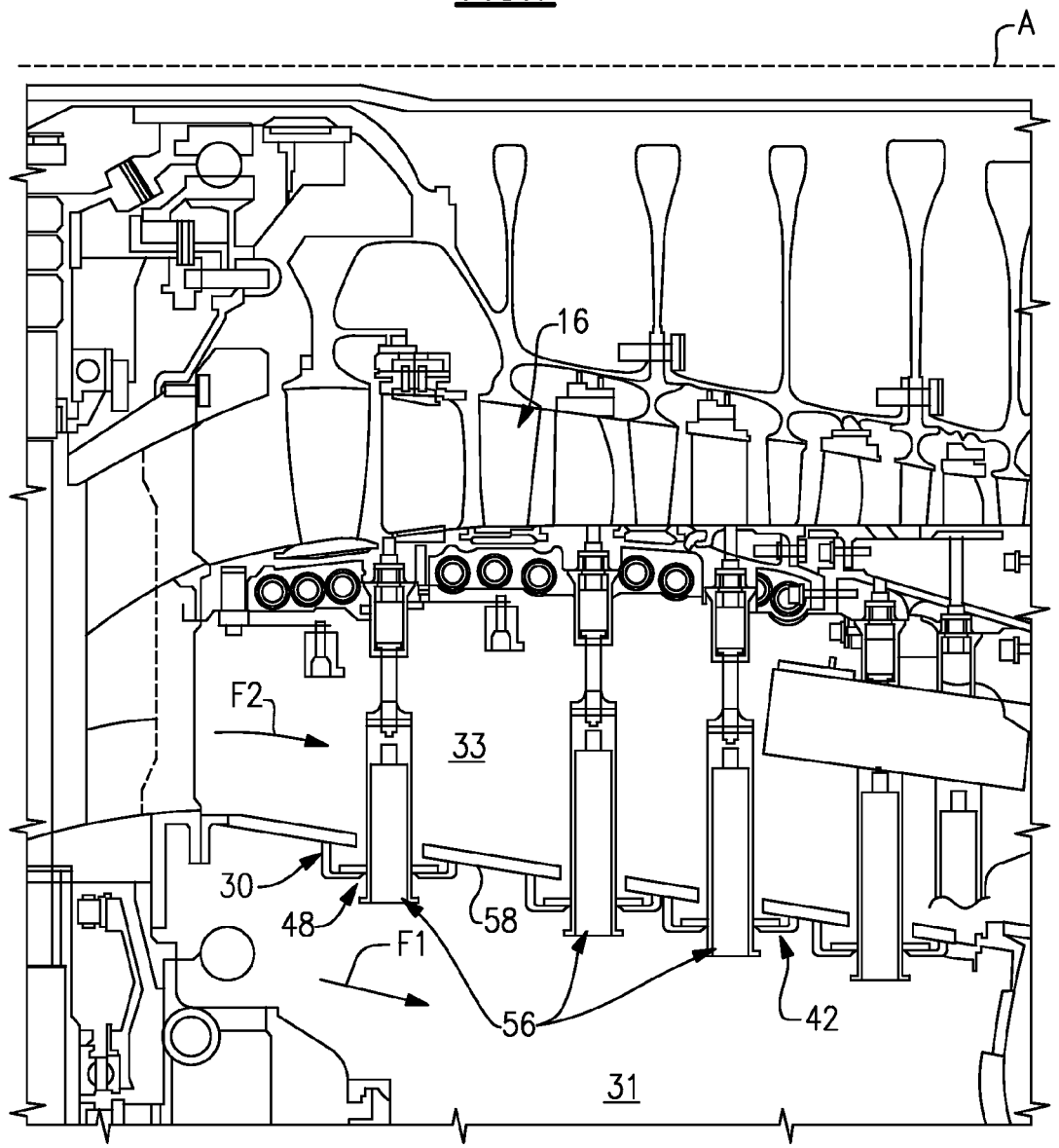
FIG. 8 illustrates a cross-sectional view of a gas turbine engine including an example mounting location for a slider seal assembly.

FIG. 8 illustrates one example mounting location for the slider seal assemblies 30. In this example, several slider seal assemblies 30 are mounted adjacent to the high pressure compressor 16 of the gas turbine engine. Interface parts 56 extends through the outer engine casing 58, through the openings 52 of each seal plate 34, and through the openings 48 of each housing 32 of each slider seal assembly 30. The interface parts 56 extend in a direction normal to the outer surface 42 of each housing 32. Therefore, during displacement of the interface parts 56 caused by thermal growth mismatch between the core passage 33 and the fan bypass passage 31, the friction load on the interface part 56 is reduced and wear is reduced at the wear surfaces W (See FIG. 5). The slider seal assemblies 30 provide adequate sealing between the interface parts 56 and the gas turbine engine 10, which provides improved efficiency of the gas turbine engine 10.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. A slider seal assembly for a gas turbine engine, comprising:
   a housing having an outer surface, an inner surface, and a recessed opening between said inner surface and said outer surface;
   a seal plate received within said recessed opening and moveable relative to said housing; and
   a retaining ring that retains said seal plate adjacent said housing, wherein said inner surface of said housing includes a curved portion curved in an outward direction toward said seal plate to match a contour of a casing of the gas turbine engine, and wherein said retaining ring includes a plurality of tabs that retains said seal plate adjacent said housing.

2. The assembly as recited in claim 1, wherein said seal plate comprises a fiber reinforced composite.

3. The assembly as recited in claim 1, wherein said recessed opening extends circumferentially from said inner surface in an outward direction toward said outer surface.

4. The assembly as recited in claim 1, wherein said curved portion is curved to match an outer contour of the gas turbine engine.

5. The assembly as recited in claim 1, wherein a body portion of said housing is generally oval shaped.

6. The assembly as recited in claim 1, wherein the curved portion is curved to match a contour of an outer engine casing of the gas turbine engine.

7. A slider seal assembly for a gas turbine engine, comprising:
   a housing having an outer surface, an inner surface, a recessed opening between said inner surface and said outer surface, and a first opening through said housing;
   a seal plate received within said recessed opening and positioned adjacent said first opening and including a second opening extending through said seal plate, said seal plate moveable relative to said housing, wherein said seal plate is received in direct contact with an inner wall of said recessed opening, and said inner surface of said housing includes a curved portion curved in an outward direction toward said seal plate to match a contour of a casing of the turbine engine; and
   an interface part extending through said first opening of said housing and said second opening of said seal plate; and, a retaining ring received within a slot extending about said recessed opening, wherein said retaining ring includes a plurality of tab portions that retain said seal plate adjacent said housing.

8. The assembly as recited in claim 7, wherein said interface part includes at least one of a borescope plug, a fuel fitting and a customer bleed port.

9. The assembly as recited in claim 7, wherein said housing includes a body portion generally surrounding said recessed opening, said recessed opening circumferentially extending from said inner surface in an outward direction toward said outer surface.

10. The assembly as recited in claim 9, wherein said housing includes at least one flange positioned radially outwardly from said body portion, said flange having an opening for receiving a fastener to attach said housing to an outer casing of a gas turbine engine, wherein a portion of said inner surface is curved to match a contour of said outer casing.

11. The assembly as recited in claim 7, wherein said seal plate comprises a fiber reinforced composite.

12. The assembly as recited in claim 7, wherein said first opening includes a first diameter and said second opening includes a second diameter, wherein said first diameter is greater than said second diameter.

13. The assembly as recited in claim 7, wherein said first opening opens into said recessed opening, said recessed opening having a diameter greater than a diameter of said first opening.

14. The assembly as recited in claim 7, wherein said seal plate may slide relative to said housing in response to displacement of said interface part.

15. The assembly as recited in claim 7, wherein said interface part is moveable relative to said housing once received through said second opening of said seal plate.

16. A gas turbine engine system, comprising:
   an outer engine casing;
   a compressor, a combustor and a turbine housed within said outer engine casing; and
   a plurality of slider seal assemblies mounted to said outer engine casing, wherein a portion of an inner surface of said plurality of slider seal assemblies is curved to match a contour of said outer engine casing, wherein each of said plurality of slider seal assemblies include a housing, a seal plate and a retaining ring with a plurality of tabs that retain the seal plate adjacent said housing, wherein said seal plate is moveable relative to said housing.

17. The system as recited in claim 16, wherein said seal plates comprise a fiber reinforced composite.

18. The system as recited in claim 16, comprising a plurality of interface parts extending through said outer engine casing and through an opening of each of said plurality of slider seal assemblies.

19. The system as recited in claim 18, wherein one of said plurality of interface parts extends through one of said plurality of slider seal assemblies.

20. The system as recited in claim 16, wherein said plurality of slider seal assemblies are mounted along a plurality of locations of said outer engine casing.

21. A slider seal assembly for a gas turbine engine, comprising:

a housing having an outer surface, a curved inner surface, and a recessed opening between said curved inner surface and said outer surface;

a seal plate received within said recessed opening and moveable relative to said housing, wherein said seal plate is received in direct contact with an inner wall of said recessed opening; and a retaining ring that retains said seal plate against said inner wall, said retaining ring received within a slot circumferentially extending about said recessed opening, wherein said retaining ring includes a plurality of radially inwardly projecting tab portions that retain said seal plate against said inner wall.

\* \* \* \* \*